(12) United States Patent
Chen et al.

(10) Patent No.: US 10,673,522 B2
(45) Date of Patent: Jun. 2, 2020

(54) METHOD, DEVICE AND SYSTEM FOR ANTENNA DELAY CALIBRATION

(71) Applicant: Hangzhou Shenhao Technology Co., Ltd, Hangzhou, Zhejiang (CN)

(72) Inventors: Rushen Chen, Zhejiang (CN); Yongyue Li, Zhejiang (CN)

(73) Assignee: HANGZHOU SHENHAO TECHNOLOGY CO., LTD, Hangzhou, Zhejiang (CN)

( * ) Notice: Subject to any disclaimer, the term of this patent is extended or adjusted under 35 U.S.C. 154(b) by 0 days.

(21) Appl. No.: 16/474,489

(22) PCT Filed: Jul. 19, 2017

(86) PCT No.: PCT/CN2017/093496
§ 371 (c)(1),
(2) Date: Jun. 27, 2019

(87) PCT Pub. No.: WO2019/006780
PCT Pub. Date: Jan. 10, 2019

(65) Prior Publication Data
US 2019/0349078 A1    Nov. 14, 2019

(30) Foreign Application Priority Data

Jul. 7, 2017  (CN) .......................... 2017 1 0550630

(51) Int. Cl.
*H04B 17/00*   (2015.01)
*H04B 7/26*    (2006.01)
(Continued)

(52) U.S. Cl.
CPC ............ *H04B 7/2603* (2013.01); *G01S 13/76* (2013.01); *H04B 17/364* (2015.01)

(58) Field of Classification Search
CPC .. H04B 7/2603; H04B 17/101; H04B 17/364; G01S 13/76; G01S 11/02; G01S 5/021; H04W 4/023; H04W 24/00
See application file for complete search history.

(56) References Cited

U.S. PATENT DOCUMENTS

| | | | |
|---|---|---|---|
| 5,248,982 A | * | 9/1993 | Reinhardt .............. H01Q 3/267 342/174 |
| 2010/0271263 A1 | * | 10/2010 | Moshfeghi ............ G01S 5/0263 342/378 |

(Continued)

FOREIGN PATENT DOCUMENTS

| | | |
|---|---|---|
| CN | 102565764 | 7/2012 |
| CN | 103744076 | 4/2014 |

(Continued)

OTHER PUBLICATIONS

International Search Report, issued in the corresponding PCT Application No. PCT/CN2017/093496, dated Mar. 21, 2018, 5 pages.

*Primary Examiner* — Andrew Wendell
(74) *Attorney, Agent, or Firm* — Hamre, Schumann, Mueller & Larson, P.C.

(57) ABSTRACT

The present invention relates to positioning technology and more particularly, to a method, device and system for antenna delay calibration. An embodiment of the present invention provides a method for antenna delay calibration, including the following steps: receiving delay and location distance between a first node and a second node; inputting the delay between the first node and the second node into a preset detection distance calculation formula to obtain a detection distance between the first node and the second node; inputting the location distance and detection distance into a preset actual delay calculation formula to obtain an actual delay; and inputting the actual delay into a node to (Continued)

calibrate and verify the node. The embodiment of the present invention obtains the actual delay by calculating the location distance and detection distance. Compared with dedicated equipment, each node is measured and calibrated, the implementation cost is low, it is convenient and fast, and the applicability is high, and batch measurements are realized as well.

21 Claims, 4 Drawing Sheets

(51) Int. Cl.
*H04B 17/364* (2015.01)
*G01S 13/76* (2006.01)

(56) References Cited

U.S. PATENT DOCUMENTS

| | | | |
|---|---|---|---|
| 2014/0057655 A1* | 2/2014 | Lee | G01S 13/74 455/456.1 |
| 2015/0382143 A1* | 12/2015 | Lindskog | H04W 4/023 455/456.1 |
| 2018/0054294 A1* | 2/2018 | Rappaport | H04B 17/104 |
| 2019/0320403 A1* | 10/2019 | Zhang | H04W 64/00 |
| 2019/0349048 A1* | 11/2019 | Huang | H04B 7/08 |

FOREIGN PATENT DOCUMENTS

| | | |
|---|---|---|
| CN | 103969631 | 8/2014 |
| WO | 85/05188 | 11/1985 |

\* cited by examiner

METHOD, DEVICE AND SYSTEM FOR ANTENNA DELAY CALIBRATION

FIELD OF THE INVENTION

The present invention relates to positioning technology and more particularly, to a method, device and system for antenna delay calibration.

BACKGROUND OF THE INVENTION

Wireless communication or distance measuring chip is mainly used for accurate indoor positioning, such as wireless communication or distance measuring chip used in an electronic fence system of a power plant or other monitoring systems that need to determine the location of a person.

Due to their different manufacturing processes, wireless communication or distance measuring chips are different from each other, especially in the hardware of the antennas of the chips. In addition, there is an antenna delay in the wireless communication or distance measuring chip itself. The so-called antenna delay is that the processor of the chip believes that signals have been transmitted, but due to hardware problems of the antenna, there is a delay in the actual signal transmission. When the chip is used to measure distance, especially to accurately measure distance, if the antenna delay cannot be effectively and accurately calibrated, there would be an error in distance measurement based on communication signal, especially in indoor distance measurement, which is measured to the nearest centimeter. If it cannot be accurately calibrated, the chip would not able to accurately measure distance.

Prior art solutions measure and calibrate each wireless communication or distance measuring chip using dedicated equipment, and then write the delay data to the chip. However, dedicated equipment is expensive and difficult to measure in batches, resulting in numerous inconveniences and low applicability.

SUMMARY OF THE INVENTION

An objective of the present invention is to solve at least one of the above problems, and to provide a method, device and system for antenna delay calibration.

In order to achieve the above objective, the present invention adopts the following technical solutions.

An embodiment of the present invention provides a method for antenna delay calibration, including the following steps:

receiving delay and location distance between a first node and a second node;

inputting the delay between the first node and the second node into a preset detection distance calculation formula to obtain a detection distance between the first node and the second node;

inputting the location distance and detection distance into a preset actual delay calculation formula to obtain an actual delay; and inputting the actual delay into a node to calibrate and verify the node.

Specifically, the delay between the first node and the second node includes:

a first round delay, including time $T_{rou1}$ beginning from the first node sending a signal to the second node and ending at the first node receiving a most recent signal returned by the second node, and time $T_{rep1}$ beginning from the second node receiving a signal sent by the first node and ending at the second node most recently returns a signal to the first node; and a second round delay, including time $T_{rou2}$ beginning from the second node reversely sending a signal to the first node and ending at the second node receiving a most recent signal returned by the first node, and time $T_{rep2}$ beginning from the first node receiving a signal sent by the second node and ending at the first node most recently returns a signal to the second node.

Further, the detection distance calculation formula is:

$$d = \frac{(T_{rou} - T_{rep})}{2} \cdot c,$$

where $T_{rou}$ is either $T_{rou1}$ or $T_{rou2}$; $T_{rep}$ is either $T_{rep1}$ or $T_{rep2}$, and c is the speed of light.

Further, the detection distance includes:

a first round detection distance calculated based on the first round delay between the first node and the second node; and a second round detection distance calculated based on the second round delay between the first node and the second node.

Specifically, the actual delay includes a transmission actual delay and reception actual delay.

Furthermore, when the first round detection distance is equal to the second round detection distance, the actual transmission delay is equal to the actual reception delay.

Moreover, when the number of the nodes is three, the delay calculation formula is:

$$\begin{cases} d_1' = d_1 + (2DT_1 + 2DR_2) \cdot c \\ d_2' = d_2 + (2DT_2 + 2DR_3) \cdot c \\ d_3' = d_3 + (2DT_3 + 2DR_1) \cdot c \\ d_1'' = d_1 + (2DR_1 + 2DT_2) \cdot c \\ d_2'' = d_2 + (2DR_2 + 2DT_3) \cdot c \\ d_3'' = d_3 + (2DR_3 + 2DT_1) \cdot c \end{cases},$$

Here, $DT_1$, $DT_2$, $DT_3$ are transmission actual delays of the three nodes respectively, $DR_1$, $DR_2$, $DR_3$ are reception actual delays of the three nodes respectively, $d_1'$, $d_2'$, $d_3'$ are first round detection distances of the three nodes respectively, $d_1''$, $d_2''$, $d_3''$ are second round detection distances of the three nodes respectively, $d_1$, $d_2$, $d_3$ are location distances among the three nodes, and c is the speed of light.

Furthermore, when the number of the nodes is three, the delay calculation formula is:

$$\begin{cases} d_1' = d_1 + (2D_1 + 2D_2) \cdot c \\ d_2' = d_2 + (2D_2 + 2D_3) \cdot c \\ d_3' = d_3 + (2D_3 + 2D_1) \cdot c \end{cases},$$

Here, $D_1$, $D_2$, $D_3$ are transmission actual delays or reception actual delays among the three nodes, $d_1'$, $d_2'$, $d_3'$ are the first or second round detection distances of the three nodes respectively, $d_1$, $d_2$, $d_3$ are location distances among the three nodes, and c is the speed of light.

Further, when the number of the nodes is n, the delay calculation formula is:

$$\begin{cases} d'_1 = d_1 + (2DT_1 + 2DR_2) \cdot c \\ d'_2 = d_2 + (2DT_2 + 2DR_3) \cdot c \\ d'_3 = d_3 + (2DT_3 + 2DR_4) \cdot c \\ \vdots \\ d'_n = d_n + (2DT_n + 2DR_1) \cdot c \\ d''_1 = d_1 + (2DR_1 + 2DT_2) \cdot c \\ d''_2 = d_2 + (2DR_2 + 2DT_3) \cdot c \\ d''_3 = d_3 + (2DR_3 + 2DT_4) \cdot c \\ \vdots \\ d''_n = d_n + (2DR_n + 2DT_1) \cdot c \end{cases}$$

Here, $DT_1$, $DT_2$, $DT_3$ ... $DT_n$ are transmission actual delays of the nodes respectively, $DR_1$, $DR_2$, $DR_3$ ... $DR_n$ are reception actual delays of the nodes respectively, $d_1'$, $d_2'$, $d_3'$ ... $d_n'$ are first round detection distances of the nodes respectively, $d_1''$, $d_2''$, $d_3''$ ... $d_n''$ are second round detection distances of the nodes respectively, $d_1$, $d_2$, $d_3$ ... $d_n$ are location distances of the nodes, and c is the speed of light.

Optionally, the location distance includes a manually determined distance or a measured actual distance.

Another embodiment of the present invention provides a device for antenna delay calibration, including:

a receiving module, configured to receive a delay and a distance between a first node and a second node;

a detection distance calculation module, configured to calculate a detection distance between the first node and the second node based on a delay between the first node and the second node;

an actual delay calculation module, configured to calculate an actual delay based on the location distance and detection distance; and a calibration module for inputting the actual delay into a node to calibrate and verify the node.

Specifically, the delay between the first node and the second node includes:

a first round delay, including time $T_{rou1}$ beginning from the first node sending a signal to the second node and ending at the first node receiving a most recent signal returned by the second node, and time $T_{rep1}$ beginning from the second node receiving a signal sent by the first node and ending at the second node most recently return a signal to the first node; and a second round delay, including time $T_{rou2}$ beginning from the second node reversely sending a signal to the first node and ending at the second node receiving a most recent signal returned by the first node, and time $T_{rep2}$ beginning from the first node receiving a signal sent by the second node and ending at the first node most recently returns a signal to the second node.

Further, the detection distance calculation formula is:

$$d = \frac{(T_{rou} - T_{rep})}{2} \cdot c,$$

where $T_{rou}$ is either $T_{rou1}$ or $T_{rou2}$, $T_{rep}$ is either $T_{rep1}$ or $T_{rep2}$, and c is the speed of light.

Further, the detection distance includes:

a first round detection distance calculated based on the first round delay between the first node and the second node; and a second round detection distance calculated based on the second round delay between the first node and the second node.

Specifically, the actual delay includes a transmission actual delay and reception actual delay.

Furthermore, when the first round detection distance is equal to the second round detection distance, the actual transmission delay is equal to the actual reception delay.

Moreover, when the number of the nodes is three, the delay calculation formula is:

$$\begin{cases} d'_1 = d_1 + (2DT_1 + 2DR_2) \cdot c \\ d'_2 = d_2 + (2DT_2 + 2DR_3) \cdot c \\ d'_3 = d_3 + (2DT_3 + 2DR_1) \cdot c \\ d''_1 = d_1 + (2DR_1 + 2DT_2) \cdot c \\ d''_2 = d_2 + (2DR_2 + 2DT_3) \cdot c \\ d''_3 = d_3 + (2DR_3 + 2DT_1) \cdot c \end{cases}$$

Here, $DT_1$, $DT_2$, $DT_3$ are transmission actual delays of the three nodes respectively, $DR_1$, $DR_2$, $DR_3$ are reception actual delays of the three nodes respectively, $d_1'$, $d_2'$, $d_3'$ are first round detection distances of the three nodes respectively, $d_1''$, $d_2''$, $d_3''$ are second round detection distances of the three nodes respectively, $d_1$, $d_2$, $d_3$ are location distances among the three nodes, and c is the speed of light.

Furthermore, when the number of the nodes is three, the delay calculation formula is:

$$\begin{cases} d'_1 = d_1 + (2D_1 + 2D_2) \cdot c \\ d'_2 = d_2 + (2D_2 + 2D_3) \cdot c, \\ d'_3 = d_3 + (2D_3 + 2D_1) \cdot c \end{cases}$$

Here, $D_1$, $D_2$, $D_3$ are transmission actual delays or reception actual delays among the three nodes, $d_1'$, $d_2'$, $d_3'$ are the first or second round detection distances of the three nodes respectively, $d_1$, $d_2$, $d_3$ are location distances among the three nodes, and c is the speed of light.

Further, when the number of the nodes is n, the delay calculation formula is:

$$\begin{cases} d'_1 = d_1 + (2DT_1 + 2DR_2) \cdot c \\ d'_2 = d_2 + (2DT_2 + 2DR_3) \cdot c \\ d'_3 = d_3 + (2DT_3 + 2DR_4) \cdot c \\ \vdots \\ d'_n = d_n + (2DT_n + 2DR_1) \cdot c \\ d''_1 = d_1 + (2DR_1 + 2DT_2) \cdot c \\ d''_2 = d_2 + (2DR_2 + 2DT_3) \cdot c \\ d''_3 = d_3 + (2DR_3 + 2DT_4) \cdot c \\ \vdots \\ d''_n = d_n + (2DR_n + 2DT_1) \cdot c \end{cases}$$

Here, $DT_1$, $DT_2$, $DT_3$ ... $DT_n$ are transmission actual delays of the nodes respectively, $DR_1$, $DR_2$, $DR_3$ ... $DR_n$ are reception actual delays of the nodes respectively, $d_1'$, $d_2'$, $d_3'$ ... $d_n'$ are first round detection distances of the nodes respectively, $d_1''$, $d_2''$, $d_3''$ ... $d_n''$ are second round detection distances of the nodes respectively, $d_1$, $d_2$, $d_3$ ... $d_n$ are location distances of the nodes, and c is the speed of light.

Optionally, the location distance includes a manually determined distance or a measured actual distance.

Another embodiment of the present invention provides a system for antenna delay calibration, including a memory and a processor, said memory being used for storing information including program instructions, the processor being used for controlling execution of the program instructions, the program instructions being loaded and executed by the processor to implement the steps of any of the delay calibration methods described above.

Compared with the prior art, the present invention has the following advantages:

At first, an embodiment of the present invention provides a method for antenna delay calibration, including the following steps: receiving delay and location distance between a first node and a second node; inputting the delay between the first node and the second node into a preset detection distance calculation formula to obtain a detection distance between the first node and the second node; inputting the location distance and detection distance into a preset actual delay calculation formula to obtain an actual delay; and inputting the actual delay into a node to calibrate and verify the node. The embodiment of the present invention obtains the actual delay by calculating the location distance and detection distance. Compared with dedicated equipment, each node is measured and calibrated, the implementation cost is low, it is convenient and fast, and the applicability is high.

Secondly, in one embodiment of the present invention, multiple nodes can be measured simultaneously by a delay calculation formula to obtain the actual delays of respective nodes to achieve batch measurement of nodes.

Additional aspects and advantages of the invention will be set forth in part in the description which follows.

BRIEF DESCRIPTION OF THE DRAWINGS

In order to better illustrate the technical solutions in the embodiments of the present invention, the drawings used in the embodiments or the prior art description will be briefly described below. Obviously, the drawings in the following description are only some of the present invention. The invention is not limited thereto.

DETAILED DESCRIPTION OF THE INVENTION

The present invention will be further described below with reference to accompanied drawings and exemplary embodiments. Here, identical numerals represent the identical components. In addition, detailed description of prior art will be omitted if it is unnecessary for illustration of the features of the present invention.

It should be understood by person of the ordinary skill in the art that unless otherwise specified, terms "a", "one", "the" and "said" in singular form may also be used in plural form. It should be further understood that the term "include" as used herein means presence of said feature, integer, step, operation, element and/or component, but not excluding presence of one or more additional other feature, integer, step, operation, element and/or component and/or their combination. The term "and/or" includes one or more related elements and all combination thereof.

It should be understood by a person of the ordinary skill in the art that unless otherwise specified, all the terminology (including technical and scientific terms) have their ordinary meaning as understood by person of the art.

Figure 1:
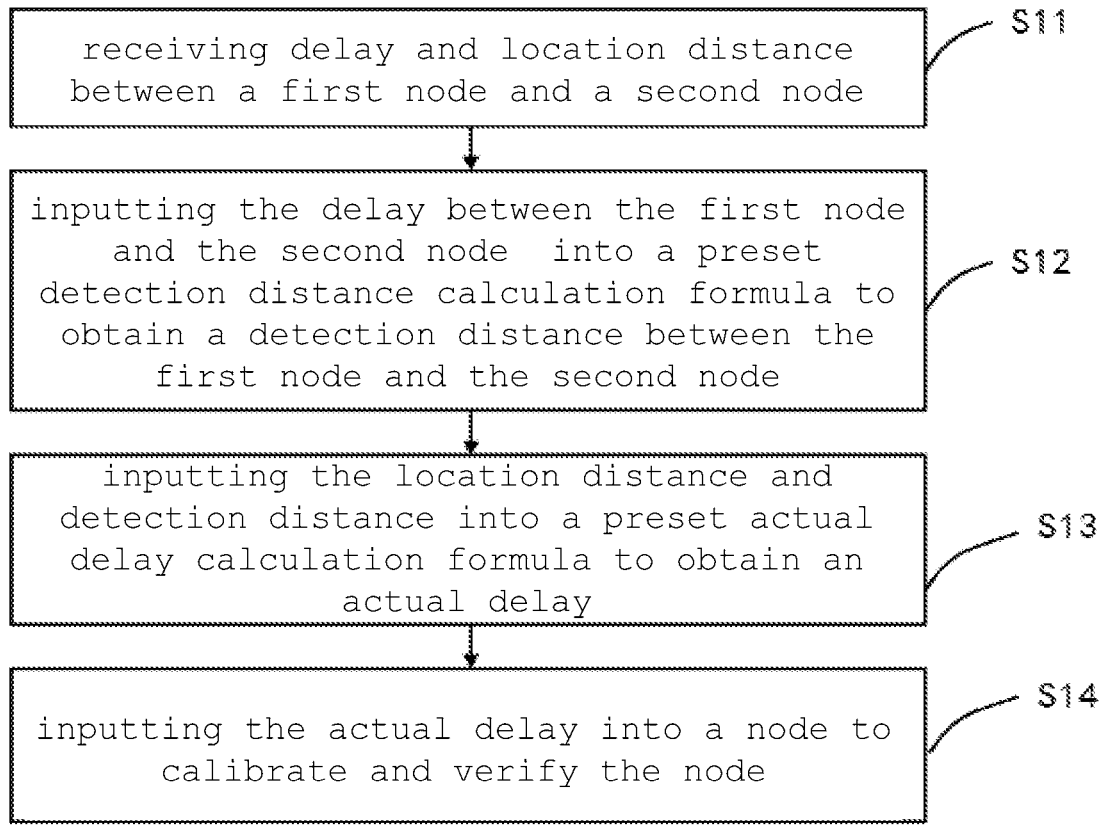
FIG. 1 is a schematic flow chart of an embodiment of an antenna delay calibration method according to the present invention.

Referring to FIG. 1, an exemplary embodiment of an antenna delay calibration method according to the present invention specifically includes the following step:

S11, receiving delay and location distance between a first node and a second node.

It should be noted that, in order to facilitate the description of the technical solution of the present invention, a wireless communication or distance measuring chip is taken as an example to illustrate the technical solution of the present invention. That is to say, the first node and the second node are wireless communication or distance measuring chips. Of course, this embodiment does not constitute a limitation on the solution of the present invention.

In an embodiment of the present invention, the location distance between the first node and the second node may be a manually determined distance or a measured actual distance.

Figure 2:
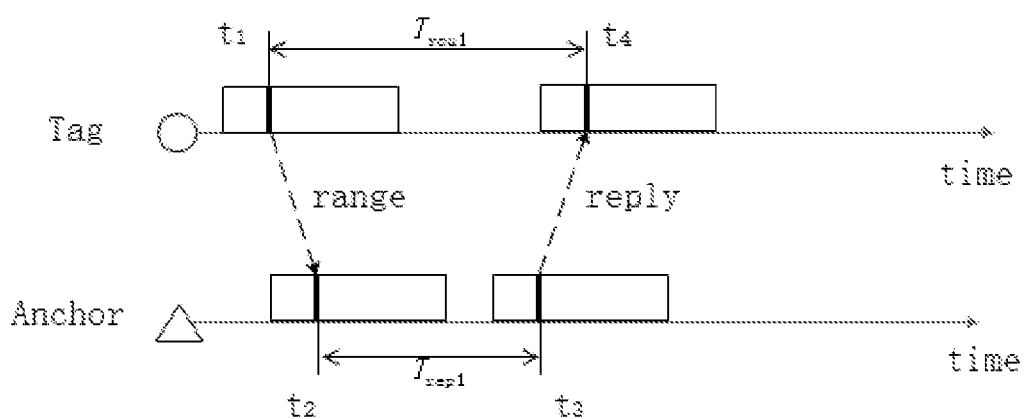
FIG. 2 is a schematic diagram of an operation of an Anchor as a transmitter and a tag as a receiver in an embodiment of an antenna delay calibration method according to the present invention.

The delay between the first node and the second node includes: a first round delay, including time $T_{rou1}$ beginning from the first node sending a signal to the second node and ending at the first node receiving a most recent signal returned by the second node, and time $T_{rep1}$ beginning from the second node receiving a signal sent by the first node and ending at the second node most recently returns a signal to the first node. As shown in FIG. 2, the Tag represents the first node and the Anchor represents the second node. First, Tag acts as a transmitter and Anchor acts as a receiver. A range signal is transmitted at time $t_1$, and the Anchor receives the range signal at time $t_2$. Next, the Anchor sends a reply signal to the Tag at time $t_3$, and the Tag receives the reply signal at a time $t_4$. Therefore, $T_{rou1}=t_4-t_1$, $T_{rep1}=t_3-t_2$, and the first round delay includes $T_{rou1}$ and $T_{rep1}$.

Figure 3:
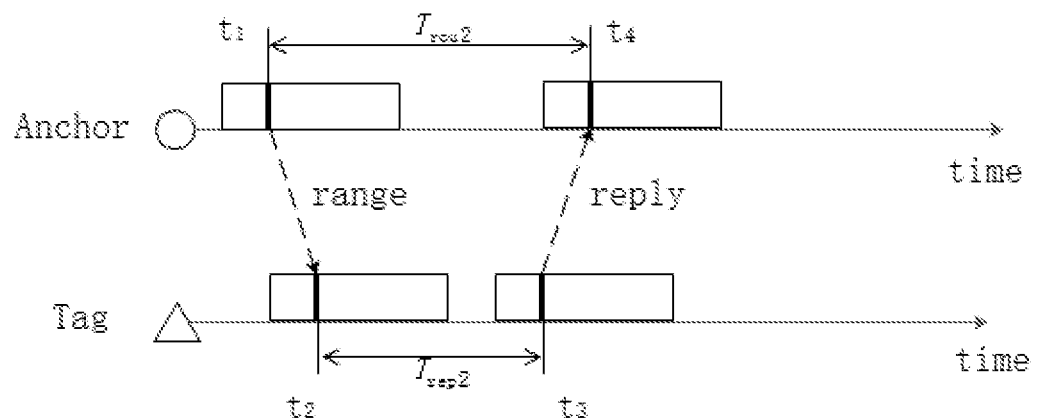
FIG. 3 is a schematic diagram of operation of Tag as a transmitter and Anchor as a receiver in an embodiment of an antenna delay calibration method according to the present invention.

The delay between the first node and the second node further includes: a second round delay, including time $T_{rou2}$ beginning from the second node reversely sending a signal to the first node and ending at the second node receiving a most recent signal returned by the first node, and time $T_{rep2}$ beginning from the first node receiving a signal sent by the second node and ending at the first node most recently returns a signal to the second node. As shown in FIG. 3, Tag represents the first node and Anchor represents the second node. Here the Anchor acts as a transmitter and Tag acts as a receiver. A range signal is transmitted at time $t_1$, and the Tag receives the range signal at time $t_2$. Next, the Tag sends a reply signal to the Anchor at time $t_3$, and the Anchor receives the reply signal at a time $t_4$. Therefore, $T_{rou1}=t_4-t_1$, $T_{rep1}=t_3-t_2$, and the second round delay includes $T_{rou2}$ and $T_{rep2}$.

Furthermore, referring to FIG. 1, an exemplary embodiment of an antenna delay calibration method according to the present invention also includes the following step:

S12, inputting the delay between the first node and the second node into a preset detection distance calculation formula to obtain a detection distance between the first node and the second node. The detection distance calculation formula is:

$$d = \frac{(T_{rou} - T_{rep})}{2} \cdot c,$$

where $T_{rou}$ is either $T_{rou1}$ or $T_{rou2}$, $T_{rep}$ is either $T_{rep1}$ or $T_{rep2}$, and c is the speed of light.

In particular, the detection distance includes:

a first round detection distance calculated based on the first round delay between the first node and the second node; and a second round detection distance calculated based on the second round delay between the first node and the second node.

Furthermore referring to FIG. 1, an exemplary embodiment of an antenna delay calibration method according to the present invention also includes the following step:

S13, inputting the location distance and detection distance into a preset actual delay calculation formula to obtain an actual delay.

Specifically, the actual delay includes a transmission actual delay and a reception actual delay. Furthermore, when the first round detection distance is equal to the second round detection distance, the actual transmission delay is equal to the actual reception delay.

Figure 4:
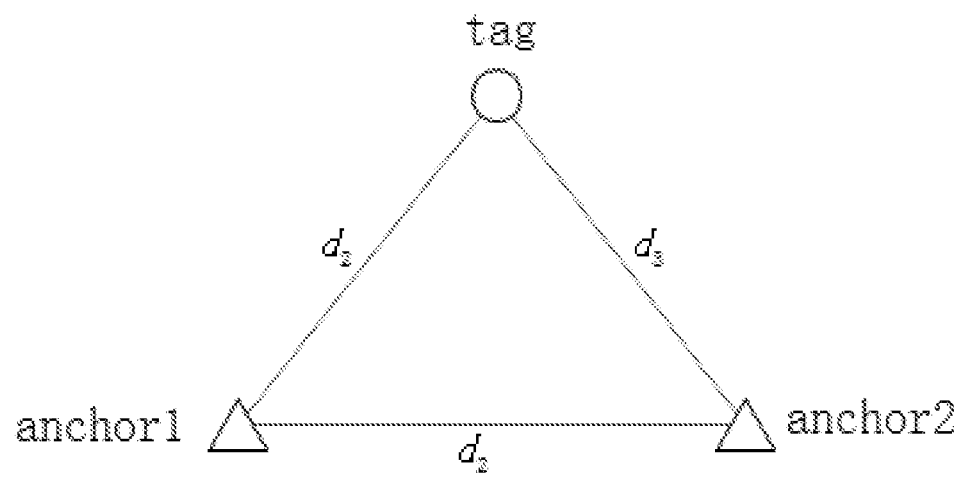
FIG. 4 is a schematic diagram of a 3-node construction in an embodiment of an antenna delay calibration method according to the present invention.

Further, in an embodiment of the present invention, delay measurement is performed on three nodes simultaneously, as shown in FIG. 4, on the premise that the actual transmission delay and the actual reception delay are equal.

Assume an antenna delay calibration system includes a Tag, an Anchor1 and an Anchor2. Assume location distances among them are $d_1$, $d_2$, $d_3$.

The tag and anchor1 perform a first round of detection distance process to obtain a detection distance $d_1'$ between the tag and the anchor1. Similarly, anchor1 and anchor2, and anchor2 and tag also perform a first round of detection distance process, obtaining the detection distances between anchor1 and anchor2, and between anchor2 and tag, $d_2'$ and $d_3'$ respectively, thereby completing the detection distances.

Assume that the antenna actual delays of the Tag and Anchors 1 and 2 are $D_1$, $D_2$, $D_3$ respectively. Based on measured $d_1'$, $d_2'$, $d_3'$ and location distances $d_1$, $d_2$, $d_3$, an actual delay calculation formula for three nodes can be obtained as follows:

$$\begin{cases} d_1' = d_1 + (2D_1 + 2D_2) \cdot c \\ d_2' = d_2 + (2D_2 + 2D_3) \cdot c \\ d_3' = d_3 + (2D_3 + 2D_1) \cdot c \end{cases}$$

The actual delays $D_1$, $D_2$, $D_3$ of the antenna of the Tag and Anchors 1 and 2 can be obtained respectively by solving the above equation.

Thus, the actual delays of the Tag, and Anchors 1 and 2 can be obtained.

Further, in another embodiment of the present invention, when the actual transmission delay and the actual reception delay are not equal, the tag and the anchor1 perform the first round detection distance process to obtain the detection distance $d_1'$ between the tag and the anchor1. Similarly, anchor1 and anchor2, and, anchor2 and tag also perform the first round of detection distance process, and the detection distances $d_2'$, $d_3'$ between anchor1 and anchor2 and between anchor2 and tag is obtained respectively, thus completing the first round of detection distance.

Reverse the same detection distance process as mentioned above. That is to say, Tag and anchor, anchor 2 and anchor1, anchor 1 and tag perform a second round of detection distance process, and the detection distances $d_3''$, $d_2''$, $d_1''$ between tag and anchor2, anchor2 and anchor1, anchor1 and tag are obtained, thus completing the second round of detection distance.

Assume that the actual antenna transmission delays of the tag and anchor1 and 2 are respectively $DT_1$, $DT_2$, $DT_3$, and also assume that the actual antenna reception delays are respectively $DR_1$, $DR_2$, $DR_3$.

Based on measured $d_1'$, $d_2'$, $d_3'$, $d_1''$, $d_2''$, $d_3''$ and known location distances $d_1$, $d_2$, $d_3$, an actual delay calculation formula for three nodes can be obtained as follows:

$$\begin{cases} d_1' = d_1 + (2DT_1 + 2DR_2) \cdot c \\ d_2' = d_2 + (2DT_2 + 2DR_3) \cdot c \\ d_3' = d_3 + (2DT_3 + 2DR_1) \cdot c \\ d_1'' = d_1 + (2DR_1 + 2DT_2) \cdot c \\ d_2'' = d_2 + (2DR_2 + 2DT_3) \cdot c \\ d_3'' = d_3 + (2DR_3 + 2DT_1) \cdot c \end{cases}$$

The actual antenna transmission delays $DT_1$, $DT_2$, $DT_3$, of the Tag and Anchors 1 and 2, and actual antenna reception delays $DR_1$, $DR_2$, $DR_3$ an be obtained respectively by solving the above equation.

Further, in another embodiment of the present invention, when the number of the nodes is n, the delay calculation formula is:

$$\begin{cases} d_1' = d_1 + (2DT_1 + 2DR_2) \cdot c \\ d_2' = d_2 + (2DT_2 + 2DR_3) \cdot c \\ d_3' = d_3 + (2DT_3 + 2DR_4) \cdot c \\ \vdots \\ d_n' = d_n + (2DT_n + 2DR_1) \cdot c \\ d_1'' = d_1 + (2DR_1 + 2DT_2) \cdot c \\ d_2'' = d_2 + (2DR_2 + 2DT_3) \cdot c \\ d_3'' = d_3 + (2DR_3 + 2DT_4) \cdot c \\ \vdots \\ d_n'' = d_n + (2DR_n + 2DT_1) \cdot c \end{cases},$$

Here, $DT_1$, $DT_2$, $DT_3$ ... $DT_n$ are transmission actual delays of the nodes respectively, $DR_1$, $DR_2$, $DR_3$ ... $DR_n$ are reception actual delays of the nodes respectively, $d_1'$, $d_2'$, $d_3'$ ... $d_n'$ are first round detection distances of the nodes respectively, $d_1''$, $d_2''$, $d_3''$ ... $d_n''$ are second round detection distances of the nodes respectively, $d_1$, $d_2$, $d_3$ ... $d_n$ are location distances of the nodes, and c is the speed of light. The actual transmission and reception delays of respective nodes can be obtained by solving the above equation.

Further, referring to FIG. 1, the method for delay calibration of an antenna according to the present invention further includes the step:

S14, inputting the actual delay into a node to calibrate and verify the node.

Writing the detected actual delay to the wireless communication or distance measuring chip would make it possible, when the chip is running a distance measuring program, to calculate the error caused by the antenna delay, thereby achieving more accurate measurement.

In summary, an antenna delay calibration method provided by an embodiment of the present invention includes: receiving delay and location distance between a first node and a second node; obtaining a detection distance between the first node and the second node based on a delay calculation between the first node and the second node; obtaining the actual delay based on the location distance and the detection distance; and performing antenna delay calibration to the actual delay. The embodiment of the present invention obtains the actual delay by calculating the location distance and detection distance. Compared with dedicated equipment, each node is measured and calibrated, the implementation cost is low, it is convenient and fast, and the applicability is high.

Figure 5:
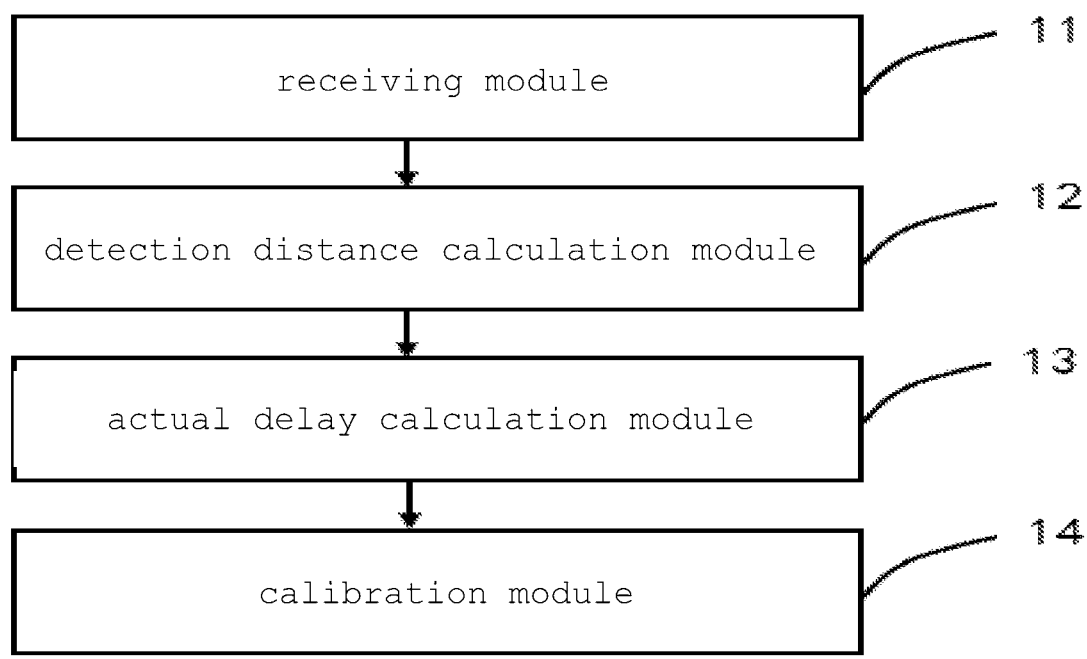
FIG. 5 is a schematically structural diagram of an embodiment of an antenna delay calibration device according to the present invention.

Furthermore, based on the function of computer software, an embodiment of the present invention also provides an antenna delay calibration device. Referring to FIG. 5, the device includes a receiving module 11, a detection distance calculation module 12, an actual delay calculation module 13 and a calibration module 14.

The receiving module 11, the detection distance calculation module 12, the actual delay calculation module 13 and the calibration module 14 function together to construct the device. The following specifically reveals the specific functions implemented by each module.

The receiving module 11 is configured to receive a delay and a distance between a first node and a second node.

It should be noted that, in order to facilitate the description of the technical solution of the present invention, a wireless communication or distance measuring chip is taken as an example to illustrate the technical solution of the present invention. That is to say, the first node and the second node are wireless communication or distance measuring chips. Of course, this embodiment does not constitute a limitation on the solution of the present invention.

In an embodiment of the present invention, the location distance between the first node and the second node may be a manually determined distance or a measured actual distance.

The delay between the first node and the second node of the receiving module includes: a first round delay, including time $T_{rou1}$ beginning from the first node sending a signal to the second node and ending at the first node receiving a most recent signal returned by the second node, and time $T_{rep1}$ beginning from the second node receiving a signal sent by the first node and ending at the second node most recently returns a signal to the first node. As shown in FIG. 2, the Tag represents the first node and the Anchor represents the second node. First, Tag acts as a transmitter and Anchor acts as a receiver. A range signal is transmitted at time $t_1$, and the Anchor receives the range signal at time $t_2$. Next, the Anchor sends a reply signal to the Tag at time $t_3$, and the Tag receives the reply signal at a time $t_4$. Therefore, $T_{rou1}=t_4-t_1$, $T_{rep1}=t_3-t_2$, and the first round delay includes $T_{rou1}$ and $T_{rep1}$.

The delay between the first node and the second node further includes: a second round delay, including time $T_{rou2}$ beginning from the second node reversely sending a signal to the first node and ending at the second node receiving a most recent signal returned by the first node, and time $T_{rep2}$ beginning from the first node receiving a signal sent by the second node and ending at the first node most recently returns a signal to the second node. As shown in FIG. 3, Tag represents the first node and Anchor represents the second node. Here the Anchor acts as a transmitter and Tag acts as a receiver. A range signal is transmitted at time $t_1$, and the Tag receives the range signal at time $t_2$. Next, the Tag sends a reply signal to the Anchor at time $t_3$, and the Anchor receives the reply signal at a time $t_4$. Therefore, $T_{rou1}=t_4-t_1$, $T_{rep1}=t_3-t_2$, and the second round delay includes $T_{rou2}$ and $T_{rep2}$.

Further, referring to FIG. 5, the detection distance calculation module 12 is configured to calculate a detection distance between the first node and the second node based on the delay between the first node and the second node.

Specifically, the detection distance calculation formula is:

$$d = \frac{(T_{rou} - T_{rep})}{2} \cdot c,$$

where $T_{rou}$ is either $T_{rou1}$ or $T_{rou2}$; $T_{rep}$ is either $T_{rep1}$ or $T_{rep2}$ and c is the speed of light.

Further, the detection distance includes:

a first round detection distance calculated based on the first round delay between the first node and the second node; and a second round detection distance calculated based on the second round delay between the first node and the second node.

Further, referring to FIG. 5, the actual delay calculation module 13 is configured to calculate an actual delay based on the location distance and the detection distance.

Specifically, the actual delay includes a transmission actual delay and reception actual delay. When the first round detection distance is equal to the second round detection distance, the actual transmission delay is equal to the actual reception delay.

Further, in an embodiment of the present invention, delay measurement is performed on three nodes simultaneously, as shown in FIG. 4, on the premise that the actual transmission delay and the actual reception delay are equal.

Assume an antenna delay calibration system includes a Tag, an Anchor1 and an Anchor2. Assume location distances among them are $d_1$, $d_2$, $d_3$. The tag and anchor1 perform a first round of detection distance process to obtain a detection distance $d_1'$ between the tag and the anchor1. Similarly, anchor1 and anchor2, and anchor2 and tag also perform a first round of detection distance process, obtaining the detection distances between anchor1 and anchor2, and between anchor2 and tag, $d_2'$ and $d_3'$ respectively, thereby completing the detection distances.

Assume that the antenna actual delays of the Tag and Anchors 1 and 2 are $D_1$, $D_2$, $D_3$ respectively. Based on measured $d_1'$, $d_2'$, $d_3'$ and known location distances $d_1$, $d_2$, $d_3$, an actual delay calculation formula for three nodes can be obtained as follows:

$$\begin{cases} d_1' = d_1 + (2D_1 + 2D_2) \cdot c \\ d_2' = d_2 + (2D_2 + 2D_3) \cdot c \\ d_3' = d_3 + (2D_3 + 2D_1) \cdot c \end{cases}$$

The actual delays $D_1$, $D_2$, $D_3$ of the antenna of the Tag and Anchors 1 and 2 can be obtained respectively by solving the above equation.

Thus, the actual delays of the Tag, and Anchors 1 and 2 can be obtained.

Further, in another embodiment of the present invention, when the actual transmission delay and the actual reception delay are not equal, the tag and the anchor1 perform the first round detection distance process to obtain the detection distance $d_1'$ between the tag and the anchor1. Similarly, anchor1 and anchor2, and, anchor2 and tag also perform the first round of detection distance process, and the detection distances $d_2'$, $d_3'$ between anchor1 and anchor2 and between anchor2 and tag is obtained respectively, thus completing the first round of detection distance.

Reverse the same detection distance process as mentioned above. That is to say, Tag and anchor, anchor 2 and anchor1, anchor 1 and tag perform a second round of detection distance process, and the detection distances $d_3''$, $d_2''$, $d_1''$ between tag and anchor2, anchor2 and anchor1, anchor1 and tag are obtained, thus completing the second round of detection distance.

Assume that the actual antenna transmission delays of the tag and anchor1 and 2 are respectively $DT_1$, $DT_2$, $DT_3$, and also assume that the actual antenna reception delays are respectively $DR_1$, $DR_2$, $DR_3$.

$$\begin{cases} d_1' = d_1 + (2DT_1 + 2DR_2) \cdot c \\ d_2' = d_2 + (2DT_2 + 2DR_3) \cdot c \\ d_3' = d_3 + (2DT_3 + 2DR_1) \cdot c \\ d_1'' = d_1 + (2DR_1 + 2DT_2) \cdot c \\ d_2'' = d_2 + (2DR_2 + 2DT_3) \cdot c \\ d_3'' = d_3 + (2DR_3 + 2DT_1) \cdot c \end{cases}$$

The actual antenna transmission delays $DT_1$, $DT_2$, $DT_3$ of the Tag and Anchors 1 and 2, and actual antenna reception delays $DR_1$, $DR_2$, $DR_3$ can be obtained respectively by solving the above equation.

Further, in another embodiment of the present invention, when the number of the nodes is n, the delay calculation formula is:

$$\begin{cases} d_1' = d_1 + (2DT_1 + 2DR_2) \cdot c \\ d_2' = d_2 + (2DT_2 + 2DR_3) \cdot c \\ d_3' = d_3 + (2DT_3 + 2DR_4) \cdot c \\ \vdots \\ d_n' = d_n + (2DT_n + 2DR_1) \cdot c \\ d_1'' = d_1 + (2DR_1 + 2DT_2) \cdot c \\ d_2'' = d_2 + (2DR_2 + 2DT_3) \cdot c \\ d_3'' = d_3 + (2DR_3 + 2DT_4) \cdot c \\ \vdots \\ d_n'' = d_n + (2DR_n + 2DT_1) \cdot c \end{cases}$$

Here, $DT_1$, $DT_2$, $DT_3$ ... $DT_n$ are transmission actual delays of the nodes respectively, $DR_1$, $DR_2$, $DR_3$ ... $DR_n$ are reception actual delays of the nodes respectively, $d_1'$, $d_2'$, $d_3'$ ... $d_n'$ are first round detection distances of the nodes respectively, $d_1''$, $d_2''$, $d_3''$ ... $d_n''$ are second round detection distances of the nodes respectively, $d_1$, $d_2$, $d_3$ ... $d_n$ are location distances of the nodes, and c is the speed of light. The actual transmission and reception delays of respective nodes can be obtained by solving the above equation.

Further, referring to FIG. 5, the actual delay calculation module 14 is configured to input the actual delay to the node to calibrate and verify the node.

The actual delay calculation module 14 writes the detected actual delay to the wireless communication or distance measuring chip such that when the chip is running a distance measuring program, the error caused by the antenna delay would be calculated, thereby achieving more accurate measurement.

In summary, an antenna delay calibration method provided by an embodiment of the present invention includes: receiving delay and location distance between a first node and a second node; inputting the delay between the first node and the second node into a preset detection distance calculation formula to obtain a detection distance between the first node and the second node; inputting the location distance and detection distance into a preset actual delay calculation formula to obtain an actual delay; and inputting the actual delay into a node to calibrate and verify the node. The embodiment of the present invention obtains the actual delay by calculating the location distance and detection distance. Compared with dedicated equipment, each node is measured and calibrated, the implementation cost is low, it is convenient and fast, and the applicability is high.

Figure 6:
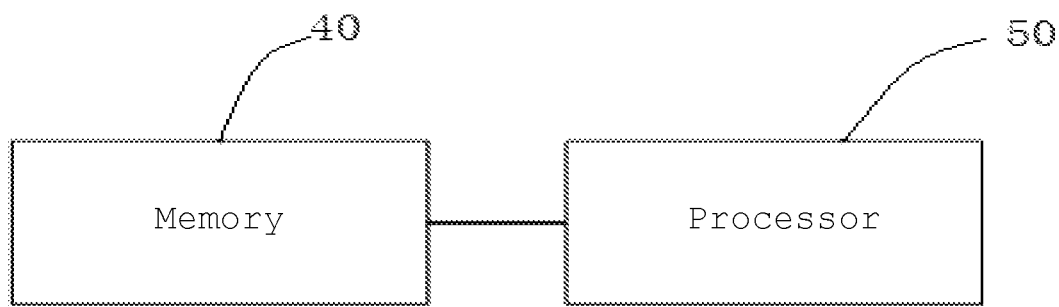
FIG. 6 is a schematically structural diagram of an embodiment of an antenna delay calibration system according to the present invention.

Further, please refer to FIG. 6, which shows a structural block diagram of a system for antenna delay calibration according to an embodiment of the present invention. The system is used to implement the above method of antenna delay calibration. For the convenience of description, only the parts related to the embodiments of the present invention are shown. If the specific technical details are not disclosed, please refer to the method part of the embodiment of the present invention.

The system includes a processor 40 and a memory 50. Here, the memory 40 can be used to store software programs and modules, and the processor 50 executes various functional applications and data processing of the system by running software programs and modules stored in the memory 40. The memory 40 can mainly include a program storage area and a data storage area. Here, the program storage area can store an operating system, an application required for at least one function, and the like. The data storage area can store data (such as audio data, phone book, etc.) created according to use of the system, etc. In addition, the memory 40 may include a high speed random access memory, and may also include a nonvolatile memory such as at least one magnetic disk storage device, flash memory device, or other volatile solid state storage device.

The processor 50 is a control center of the system that connects various portions of the entire system, and by using various interfaces and lines, running or executing software programs and/or modules stored in the memory 40, and by calling them in the memory 40, internal data, performs various functions of the system and processes data to perform overall monitoring of the system.

Optionally, the processor 50 may include one or more processing units. Preferably, the processor 50 may integrate an application processor and a modem processor, where the application processor mainly processes an operating system, a user interface, an application, and the like. The modem processor mainly handles wireless communication. It can be understood that the above modem processor may not be integrated into the processor 50.

It is not difficult to understand that although not shown, the system also includes a power supply for supplying power to the various components. Preferably, the power supply can be logically connected to the processor 50 through a power management system to manage functions such as charging, discharging, and power management through the power management system. It may also include radio frequency (RF) circuits, input units, display units, sensors, audio circuits, wireless modules, and the like.

In one embodiment of the present invention, the memory 40 is for storing information including program instructions, and the processor 50 is for controlling execution of program instructions, which are implemented when the processor 50 is loaded and executed to realize the following features:

receiving delay and location distance between a first node and a second node;

inputting the delay between the first node and the second node into a preset detection distance calculation formula to obtain a detection distance between the first node and the second node;

inputting the location distance and detection distance into a preset actual delay calculation formula to obtain an actual delay; and inputting the actual delay into a node to calibrate and verify the node.

Specifically, the delay between the first node and the second node includes:

a first round delay, including time $T_{rou1}$ beginning from the first node sending a signal to the second node and ending at the first node receiving a most recent signal returned by the second node, and time $T_{rep1}$ beginning from the second node receiving a signal sent by the first node and ending at the second node most recently returns a signal to the first node; and a second round delay, including time $T_{rou2}$ beginning from the second node reversely sending a signal to the first node and ending at the second node receiving a most recent signal returned by the first node, and time $T_{rep2}$ beginning from the first node receiving a signal sent by the second node and ending at the first node most recently returns a signal to the second node.

Further, the detection distance calculation formula is:

$$d = \frac{(T_{rou} - T_{rep})}{2} \cdot c,$$

where $T_{rou}$ is either $T_{rou1}$ or $T_{rou2}$, $T_{rep}$ is either $T_{rep1}$ or $T_{rep2}$ and c is the speed of light.

Further, the detection distance includes:

a first round detection distance calculated based on the first round delay between the first node and the second node; and a second round detection distance calculated based on the second round delay between the first node and the second node.

Specifically, the actual delay includes a transmission actual delay and reception actual delay.

Furthermore, when the first round detection distance is equal to the second round detection distance, the actual transmission delay is equal to the actual reception delay.

Moreover, when the number of the nodes is three, the delay calculation formula is:

$$\begin{cases} d'_1 = d_1 + (2DT_1 + 2DR_2) \cdot c \\ d'_2 = d_2 + (2DT_2 + 2DR_3) \cdot c \\ d'_3 = d_3 + (2DT_3 + 2DR_1) \cdot c \\ d''_1 = d_1 + (2DR_1 + 2DT_2) \cdot c \\ d''_2 = d_2 + (2DR_2 + 2DT_3) \cdot c \\ d''_3 = d_3 + (2DR_3 + 2DT_1) \cdot c \end{cases},$$

Here, $DT_1, DT_2, DT_3$ are transmission actual delays of the three nodes respectively, $DR_1, DR_2, DR_3$ are reception actual delays of the three nodes respectively, $d_1', d_2', d_3'$ are first round detection distances of the three nodes respectively, $d_1'', d_2'', d_3''$ are second round detection distances of the three nodes respectively, $d_1, d_2, d_3$ are location distances among the three nodes, and c is the speed of light.

Furthermore, when the number of the nodes is three, the delay calculation formula is:

$$\begin{cases} d'_1 = d_1 + (2D_1 + 2D_2) \cdot c \\ d'_2 = d_2 + (2D_2 + 2D_3) \cdot c \\ d'_3 = d_3 + (2D_3 + 2D_1) \cdot c \end{cases},$$

Here, $D_1, D_2, D_3$ are transmission actual delays or reception actual delays among the three nodes, $d_1', d_2', d_3'$ are the first or second round detection distances of the three nodes respectively, $d_1, d_2, d_3$ are location distances among the three nodes, and c is the speed of light.

Further, when the number of the nodes is n, the delay calculation formula is:

$$\begin{cases} d'_1 = d_1 + (2DT_1 + 2DR_2) \cdot c \\ d'_2 = d_2 + (2DT_2 + 2DR_3) \cdot c \\ d'_3 = d_3 + (2DT_3 + 2DR_4) \cdot c \\ \vdots \\ d'_n = d_n + (2DT_n + 2DR_1) \cdot c \\ d''_1 = d_1 + (2DR_1 + 2DT_2) \cdot c \\ d''_2 = d_2 + (2DR_2 + 2DT_3) \cdot c \\ d''_3 = d_3 + (2DR_3 + 2DT_4) \cdot c \\ \vdots \\ d''_n = d_n + (2DR_n + 2DT_1) \cdot c \end{cases},$$

Here, $DT_1, DT_2, DT_3 \ldots DT_n$ are transmission actual delays of the nodes respectively, $DR_1, DR_2, DR_3 \ldots DR_n$ are reception actual delays of the nodes respectively, $d_1', d_2', d_3' \ldots d_n'$ are first round detection distances of the nodes respectively, $d_1'', d_2'', d_3'' \ldots d_n''$ are second round detection distances of the nodes respectively, $d_1, d_2, d_3 \ldots d_n$ are location distances of the nodes, and c is the speed of light.

Optionally, the location distance includes a manually determined distance or a measured actual distance.

In the description provided herein, numerous specific details are set forth. However, it is understood that the embodiments of the present invention may be practiced without these specific details. In some embodiments, well-known methods, structures, and techniques are not shown in detail so as not to obscure the description.

Though various embodiments of the invention have been illustrated above, a person of ordinary skill in the art will understand that, variations and improvements made upon the illustrative embodiments fall within the scope of the invention, and the scope of the invention is only limited by the accompanying claims and their equivalents.

The invention claimed is:

1. A method for antenna delay calibration, comprising the following steps:

receiving delay and location distance between a first node and a second node;

inputting the delay between the first node and the second node into a preset detection distance calculation formula to obtain a detection distance between the first node and the second node;

inputting the location distance and detection distance into a preset actual delay calculation formula to obtain an actual delay; and inputting the actual delay into a node to calibrate and verify the node.

2. The method as recited in claim 1, wherein the delay between the first node and the second node comprises:

a first round delay, including time $T_{rou1}$ beginning from the first node sending a signal to the second node and ending at the first node receiving a most recent signal returned by the second node, and time $T_{rep1}$ beginning from the second node receiving a signal sent by the first node and ending at the second node most recently returns a signal to the first node; and a second round delay, including time $T_{rou2}$ beginning from the second node reversely sending a signal to the first node and ending at the second node receiving a most recent signal returned by the first node, and time $T_{rep2}$ beginning from the first node receiving a signal sent by the second node and ending at the first node most recently returns a signal to the second node.

3. The method as recited in claim 2, wherein the detection distance calculation formula is:

$$d = \frac{(T_{rou} - T_{rep})}{2} \cdot c,$$

where $T_{rou}$ is either $T_{rou1}$ or $T_{rou2}$; $T_{rep}$ is either $T_{rep1}$ or $T_{rep2}$, and c is the speed of light.

4. The method as recited in claim 2, wherein the detection distance comprises:

a first round detection distance calculated based on the first round delay between the first node and the second node; and a second round detection distance calculated based on the second round delay between the first node and the second node.

5. The method as recited in claim 4, wherein the actual delay comprises a transmission actual delay and a reception actual delay.

6. The method as recited in claim 5, wherein when the first round detection distance is equal to the second round detection distance, the actual transmission delay is equal to the actual reception delay.

7. The method as recited in claim 5, wherein when the number of the nodes is three, the actual delay calculation formula is:

$$\begin{cases} d_1' = d_1 + (2DT_1 + 2DR_2) \cdot c \\ d_2' = d_2 + (2DT_2 + 2DR_3) \cdot c \\ d_3' = d_3 + (2DT_3 + 2DR_1) \cdot c \\ d_1'' = d_1 + (2DR_1 + 2DT_2) \cdot c \\ d_2'' = d_2 + (2DR_2 + 2DT_3) \cdot c \\ d_3'' = d_3 + (2DR_3 + 2DT_1) \cdot c \end{cases},$$

wherein, $DT_1$, $DT_2$, $DT_3$ are transmission actual delays of the three nodes respectively, $DR_1$, $DR_2$, $DR_3$ are reception actual delays of the three nodes respectively, $d_1'$, $d_2'$, $d_3'$ are first round detection distances of the three nodes respectively, $d_1''$, $d_2''$, $d_3''$ are second round detection distances of the three nodes respectively, $d_1$, $d_2$, $d_3$ are location distances among the three nodes, and c is the speed of light.

8. The method as recited in claim 6, wherein when the number of the nodes is three, the actual delay calculation formula is:

$$\begin{cases} d_1' = d_1 + (2D_1 + 2D_2) \cdot c \\ d_2' = d_2 + (2D_2 + 2D_3) \cdot c \\ d_3' = d_3 + (2D_3 + 2D_1) \cdot c \end{cases},$$

wherein, $D_1$, $D_2$, $D_3$ are transmission actual delays or reception actual delays among the three nodes, $d_1'$, $d_2'$, $d_3'$ are the first or second round detection distances of the three nodes respectively, $d_1$, $d_2$, $d_3$ are location distances among the three nodes, and c is the speed of light.

9. The method as recited in claim 5, wherein when the number of the nodes is n, the actual delay calculation formula is:

$$\begin{cases} d_1' = d_1 + (2DT_1 + 2DR_2) \cdot c \\ d_2' = d_2 + (2DT_2 + 2DR_3) \cdot c \\ d_3' = d_3 + (2DT_3 + 2DR_4) \cdot c \\ \vdots \\ d_n' = d_n + (2DT_n + 2DR_1) \cdot c \\ d_1'' = d_1 + (2DR_1 + 2DT_2) \cdot c \\ d_2'' = d_2 + (2DR_2 + 2DT_3) \cdot c \\ d_3'' = d_3 + (2DR_3 + 2DT_4) \cdot c \\ \vdots \\ d_n'' = d_n + (2DR_n + 2DT_1) \cdot c \end{cases},$$

wherein, $DT_1$, $DT_2$, $DT_3$ ... $DT_n$ are transmission actual delays of the nodes respectively, $DR_1$, $DR_2$, $DR_3$ ... $DR_n$ are reception actual delays of the nodes respectively, $d_1'$, $d_2'$, $d_3'$ ... $d_n'$ are first round detection distances of the nodes respectively, $d_1''$, $d_2''$, $d_3''$ ... $d_n''$ are second round detection distances of the nodes respectively, $d_1$, $d_2$, $d_3$ ... $d_n$ are location distances of the nodes, and c is the speed of light.

10. The method as recited in claim 1, wherein the location distance comprises a manually determined distance or a measured actual distance.

11. A system for antenna delay calibration, comprising a memory and a processor, said memory being used for storing information including program instructions, the processor being used for controlling execution of the program instructions, the program instructions being loaded and executed by the processor to implement the steps of any of the delay calibration methods recited in claim 1.

12. A device for antenna delay calibration, comprising:
- a receiving module, configured to receive a delay and a location distance between a first node and a second node;
- a detection distance calculation module, configured to calculate a detection distance between the first node and the second node based on the delay between the first node and the second node;
- an actual delay calculation module, configured to calculate an actual delay based on the location distance and detection distance; and
- a calibration module for inputting the actual delay into a node to calibrate and verify the node.

13. The device as recited in claim 12, wherein the delay between the first node and the second node comprises:
- a first round delay, including time $T_{rou1}$ beginning from the first node sending a signal to the second node and ending at the first node receiving a most recent signal returned by the second node, and time $T_{rep1}$ beginning from the second node receiving a signal sent by the first node and ending at the second node most recently returns a signal to the first node; and
- a second round delay, including time $T_{rou2}$ beginning from the second node reversely sending a signal to the first node and ending at the second node receiving a most recent signal returned by the first node, and time $T_{rep2}$ beginning from the first node receiving a signal sent by the second node and ending at the first node most recently returns a signal to the second node.

14. The device as recited in claim 13, wherein the detection distance calculation formula is:

$$d = \frac{(T_{rou} - T_{rep})}{2} \cdot c,$$

where $T_{rou}$ is either $T_{rou1}$ or $T_{rou2}$; $T_{rep}$ is either $T_{rep1}$ or $T_{rep2}$, and c is the speed of light.

15. The device as recited in claim 13, wherein the detection distance comprises:
- a first round detection distance calculated based on the first round delay between the first node and the second node; and
- a second round detection distance calculated based on the second round delay between the first node and the second node.

16. The device as recited in claim 15, wherein the actual delay comprises a transmission actual delay and a reception actual delay.

17. The device as recited in claim 16, wherein when the first round detection distance is equal to the second round detection distance, the actual transmission delay is equal to the actual reception delay.

18. The device as recited in claim 16, wherein when the number of the nodes is three, the actual delay calculation formula is:

$$\begin{cases} d'_1 = d_1 + (2DT_1 + 2DR_2) \cdot c \\ d'_2 = d_2 + (2DT_2 + 2DR_3) \cdot c \\ d'_3 = d_3 + (2DT_3 + 2DR_1) \cdot c \\ d''_1 = d_1 + (2DR_1 + 2DT_2) \cdot c \\ d''_2 = d_2 + (2DR_2 + 2DT_3) \cdot c \\ d''_3 = d_3 + (2DR_3 + 2DT_1) \cdot c \end{cases},$$

wherein, $DT_1$, $DT_2$, $DT_3$ are transmission actual delays of the three nodes respectively, $DR_1$, $DR_2$, $DR_3$ are reception actual delays of the three nodes respectively, $d_1'$, $d_2'$, $d_3'$ are first round detection distances of the three nodes respectively, $d_1''$, $d_2''$, $d_3''$ are second round detection distances of the three nodes respectively, $d_1$, $d_2$, $d_3$ are location distances among the three nodes, and c is the speed of light.

19. The device as recited in claim 17, wherein when the number of the nodes is three, the actual delay calculation formula is:

$$\begin{cases} d'_1 = d_1 + (2D_1 + 2D_2) \cdot c \\ d'_2 = d_2 + (2D_2 + 2D_3) \cdot c \\ d'_3 = d_3 + (2D_3 + 2D_1) \cdot c \end{cases},$$

wherein, $D_1$, $D_2$, $D_3$ are transmission actual delays or reception actual delays among the three nodes, $d_1'$, $d_2'$, $d_3'$ are the first or second round detection distances of the three nodes respectively, $d_1$, $d_2$, $d_3$ are location distances among the three nodes, and c is the speed of light.

20. The device as recited in claim 16, wherein when the number of the nodes is n, the actual delay calculation formula is:

$$\begin{cases} d'_1 = d_1 + (2DT_1 + 2DR_2) \cdot c \\ d'_2 = d_2 + (2DT_2 + 2DR_3) \cdot c \\ d'_3 = d_3 + (2DT_3 + 2DR_4) \cdot c \\ \vdots \\ d'_n = d_n + (2DT_n + 2DR_1) \cdot c \\ d''_1 = d_1 + (2DR_1 + 2DT_2) \cdot c \\ d''_2 = d_2 + (2DR_2 + 2DT_3) \cdot c \\ d''_3 = d_3 + (2DR_3 + 2DT_4) \cdot c \\ \vdots \\ d''_n = d_n + (2DR_n + 2DT_1) \cdot c \end{cases},$$

wherein, $DT_1$, $DT_2$, $DT_3$ ... $DT_n$ are transmission actual delays of the nodes respectively, $DR_1$, $DR_2$, $DR_3$ ... $DR_n$ are reception actual delays of the nodes respectively, $d_1'$, $d_2'$, $d_3'$ ... $d_n'$ are first round detection distances of the nodes respectively, $d_1''$, $d_2''$, $d_3''$ ... $d_n''$ are second round detection distances of the nodes respectively, $d_1$, $d_2$, $d_3$ ... $d_n$ are location distances of the nodes, and c is the speed of light.

21. The device as recited in claim 12, wherein the location distance comprises a manually determined distance or a measured actual distance.

* * * * *